United States Patent [19]
Arizumi et al.

[11] Patent Number: 4,995,109
[45] Date of Patent: Feb. 19, 1991

[54] COMMUNICATION WITH A NON-TELEPHONE TERMINAL VIA A TELEPHONE SWITCHING NETWORK USING TWO CONSECUTIVE CALLS

[75] Inventors: Masato Arizumi; Norio Ozawa, both of Tokyo; Yasurou Fukawa, Hiratuka, all of Japan

[73] Assignees: Oki Electric Industry Co., Ltd., Tokyo; Any Co., Ltd., Kanagawa, both of Japan

[21] Appl. No.: 356,209

[22] Filed: May 24, 1989

[51] Int. Cl.$^5$ .............................. H04M 11/00
[52] U.S. Cl. .................... 379/107; 379/106; 379/102; 379/104; 379/105; 379/93
[58] Field of Search ............ 379/107, 106, 92, 98, 379/93, 102, 104, 105

[56] References Cited

U.S. PATENT DOCUMENTS

| | | | |
|---|---|---|---|
| 3,702,904 | 11/1972 | Bard | 379/105 |
| 4,022,977 | 5/1977 | Nomura | 379/107 |
| 4,126,762 | 11/1978 | Martin et al. | 379/106 |
| 4,232,195 | 11/1980 | Bartelink | 379/106 |
| 4,654,868 | 3/1987 | Shelley | 379/107 |
| 4,845,773 | 7/1989 | Attallah | 379/102 |
| 4,847,892 | 7/1989 | Shelley | 379/92 |

OTHER PUBLICATIONS

"Interface for No-Ringing Communication Service" publ. by Nippon Telegraph and Telephone Co., Ltd., Japan, Oct. 15, 1987.
*Understanding Telephone Electronics*, Fike, 1983.

Primary Examiner—Jin F. Ng
Assistant Examiner—Stella L. Woo
Attorney, Agent, or Firm—Spencer & Frank

[57] ABSTRACT

A telecommunications system allows data communications between a data center and a non-telephone terminal via a telephone switching network. A terminal adapter connected to a first telephone line of the network is also connected to the non-telephone terminal and a telephone terminal. A center adapter is connected between the data center and a second telephone line. The center adapter originates a first call destined to the terminal adapter and releases it upon detecting the call terminating to the terminal adapter. The center adapter then originates a second call destined to the same terminal adapter. The center adapter detects the successive terminations of the two calls to connect the telephone line to the non-telephone terminal to allow data transmission between the data center and the non-telephone terminal.

19 Claims, 10 Drawing Sheets

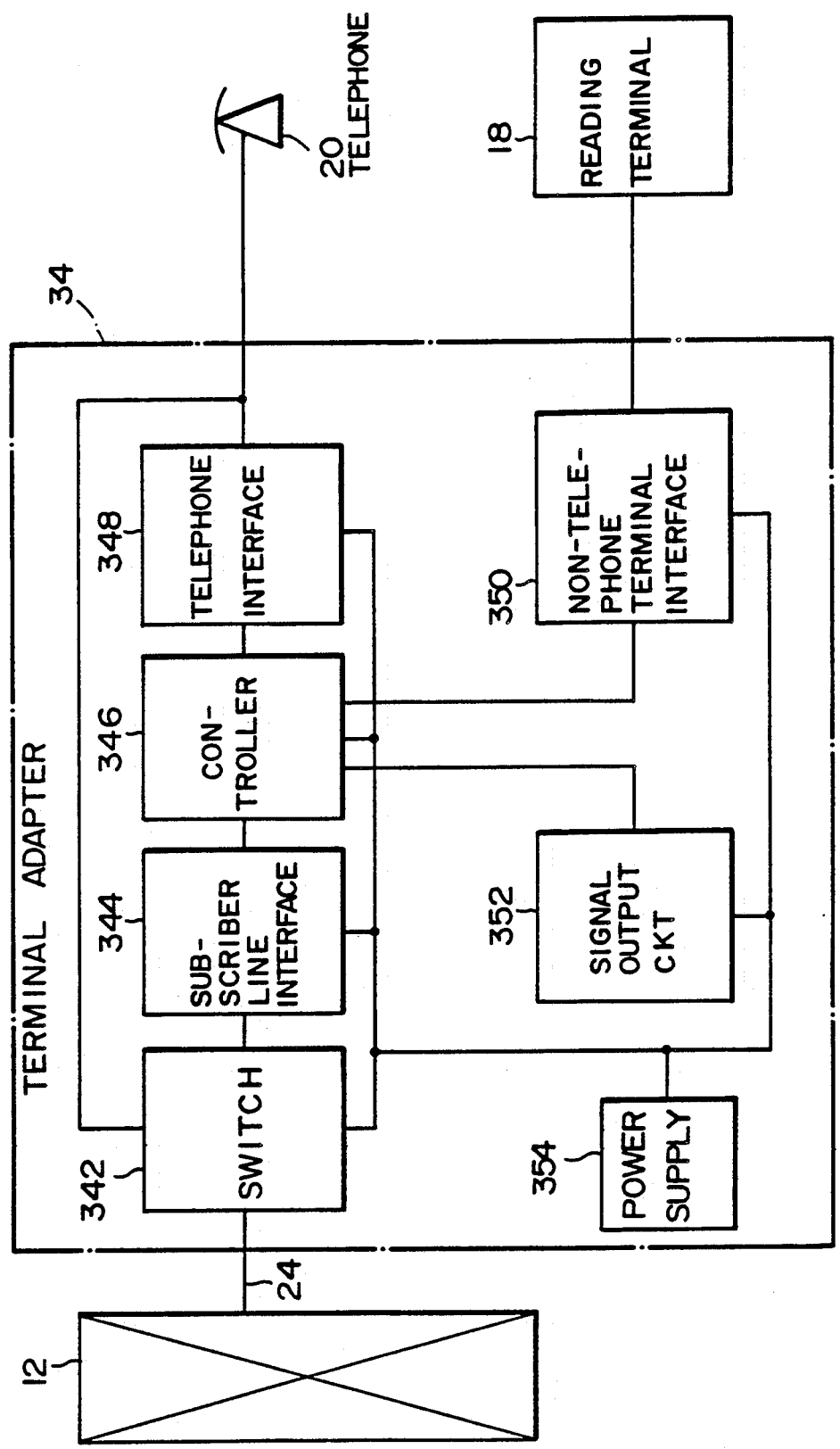

COMMUNICATION WITH A NON-TELEPHONE TERMINAL VIA A TELEPHONE SWITCHING NETWORK USING TWO CONSECUTIVE CALLS

BACKGROUND OF THE INVENTION

1. Field of the Invention

The present invention relates to a telecommunications system for implementing telecommunications between a terminal other than a telephone, i.e., a non-telephone terminal accommodated in a switched telephone network or similar telephone switching network and a supervising center which is also accommodated in the telephone network and controls a plurality of non-telephone terminals.

2. Description of the Prior Art

The inspection of an LPG (Liquefied Petroleum gas) meter, for example, may be automated by providing a subscriber with a reading terminal which shares the same line as a telephone and allowing a supervising center which supervises the reading terminal to communicate with the terminal over a telephone switching network so as to collect data from the terminal, send alarm information to the terminal, and perform other various functions as needed, as already proposed in the telecommunications art. A predominant approach for implementing such telecommunications by a relatively simple configuration is a terminal origination type system.

In a prior art terminal call origination type system, a terminal adapter is connected to a telephone line or subscriber line which is accommodated in a switched telephone network, while a reading terminal and a subscriber set telephone are connected to the terminal adapter. The reading terminal is capable of accessing a supervising center over the telephone switching network by calling the telephone network via the terminal adapter. The terminal adapter plays the role of a network control unit which selectively connects the telephone and reading terminal to the telephone switching network.

A prerequisite with the automatic LPG supply service is that the reading terminal sends readings and similar data periodically to the supervising center while the center sends data to the reading terminal. By sending data to the reading terminal, the center may govern the reading terminal for various purposes such as checking the terminal when collected data is unusual, on-off controlling the gas valve in the event of the subscriber's long absence, examining the conditions of use of LPG as needed, resetting a counter installed in the terminal to zero, informing the terminal of a change of the telephone number of the center itself, and correcting a timepiece built in the terminal adapter. While some of these control items are sufficiently achievable even if a command in the form of data is transmitted by using a communication path which will be set up when the terminal accesses the supervising center, the others cannot be implemented unless the center delivers a command whenever occasion calls. However, since the terminal call origination type system does not allow the supervising center to call the terminal, the control items of the kind needing occasional delivery of command as mentioned above have to rely on some alternative means such as a conversation on a telephone or the dispatch of a person in charge to the terminal.

In the light of the above, there has been proposed by Nippon Telegraph and Telephone Co., Ltd, an "Interface for No-Ringing Communication Service" which allows a central station to call a terminal at any time, i.e. a center call origination type system. In the proposed center call origination type system, a no-ringing trunk is provided in a local switch in which a reading terminal is accommodated through a terminal adapter, i.e. a receiving local switch. Built in the local switch for calling a reading terminal, the no-ringing trunk has appearances which are individually accommodated in the incoming and outgoing ends of the local switch. When the central station originates a call meant for the reading terminal, a ringing having a particular frequency is sent from the no-ringing trunk to the terminal adapter. On receiving the ringing, the terminal adapter recognizes that call is destined to the associated reading terminal and thereby connects the telephone line to the terminal.

A drawback with the center call origination type system is that the special no-ringing trunk installed in the receiving local switch increases the cost of the entire switch. Especially, when the number of non-telephone terminals accommodated in the local switch is relatively small, the cost-effectiveness is critically lowered by the installation of the no-ringing trunk in the local switch. This obstructs the extensive application of the control of non-telephone terminals by a supervising center.

SUMMARY OF THE INVENTION

It is therefore an object of the present invention to provide a system which allows a supervising center and a non-telephone terminal to hold a communication with each other without resorting to the modification of an existing switching system.

In accordance with the present invention, a supervising center calls subscriber equipment on the basis of a prearranged system by using a telephone number assigned to the subscriber equipment, while the subscriber equipment on recognizing the call connects the telephone line to a non-telephone terminal which is associated with the subscriber equipment.

a telecommunications system of the present invention comprises a telephone switching network for switching a plurality of telephone lines, a telephone accessible to the telephone switching network, a non-telephone terminal for performing data communication via the telephone switching network, a first network control unit connected to a first telephone line of the plurality of telephone lines for controlling connection of the telephone and non-telephone terminal and the telephone switching network, center equipment for supervising data communication to the non-telephone terminal, and a second network control unit connected to a second telephone line of the plurality of telephone lines for controlling connection of the center equipment and the telephone switching network. The second network control unit originates a call to the telephone switching network in response to the center equipment by using a subscriber number which is assigned to the telephone. The telephone switching network terminates the call at the first telephone line in response to the subscriber number and informs the second network control unit of the termination at the first telephone line via the second telephone line. The second network control unit releases the call on detecting the termination at the first telephone line and, thereafter, sends a call to the telephone switching network again by using the subscriber number. The telephone switching network terminates the call in response to the subscriber number. The first network control unit, on detecting the termination over the first telephone line and subsequent release of the call and then detecting termination again, connects the non-telephone terminal to the first telephone line in response to the latter termination. The telephone switching network sets up connection between the first and second telephone lines in response to an answer from the first network control unit.

In accordance with the present invention, to call a non-telephone terminal, a supervising center sends the first call to a telephone switching network by using a telephone number or subscriber number of a telephone which is paired with the non-telephone terminal. In response, the telephone switching network returns a ringing tone to the center. On confirming the ringing tone, the center ends the first call and then sends the second call by using the same subscriber number. A terminal adapter called once connects the non-telephone terminal to a telephone line on detecting the second call within a predetermined period of time after the release of the first call.

Further, a telecommunications control apparatus of the present invention comprises a line terminating unit for connecting a first and a second telephone line accommodated in a telephone switching network, an interface for connecting center equipment which supervises data communication to a non-telephone terminal which is connected to the center equipment via the telephone switching network, and a controller for controlling the line terminating unit and interface in response to the center equipment. The controller originates calls, in response to the center equipment, to the telephone switching network over a first and second telephone line substantially at the same time by using a subscriber number which is associated with the non-telephone terminal. The controller, on detecting a busy tone on either one of the first and second telephone lines, releases the calls on the first and second telephone lines and then calls the telephone switching network again by using the subscriber number. The non-telephone terminal and the center equipment are then allowed to hold a data communication with each other.

In accordance with the present invention, a supervising center an a telephone switching network are interconnected by two telephone lines so that the center may effect the first call over the two lines at the same time by using the same subscriber number. If a called terminal is not busy, a busy tone is returned to the center over one of the two lines and a ringing tone is returned to the same over the other line. On confirming the busy tone, the center ends the first call when a predetermined period of time expires and then effects the second call by using the same subscriber number. When a terminal adapter confirms the consecutive first and second calls from the center, it connects the telephone switching network and the non-telephone terminal to thereby allow the center and the terminal to interchange data with each other.

BRIEF DESCRIPTION OF THE DRAWINGS

The above and other features of the present invention will become more apparent from the consideration of the following detailed description taken in conjunction with the accompanying drawings in which:

FIG. 7 is a schematic block diagram showing a specific construction of a terminal adapter also included in the embodiment of FIG. 5;

DESCRIPTION OF THE PREFERRED EMBODIMENTS

Figure 1:
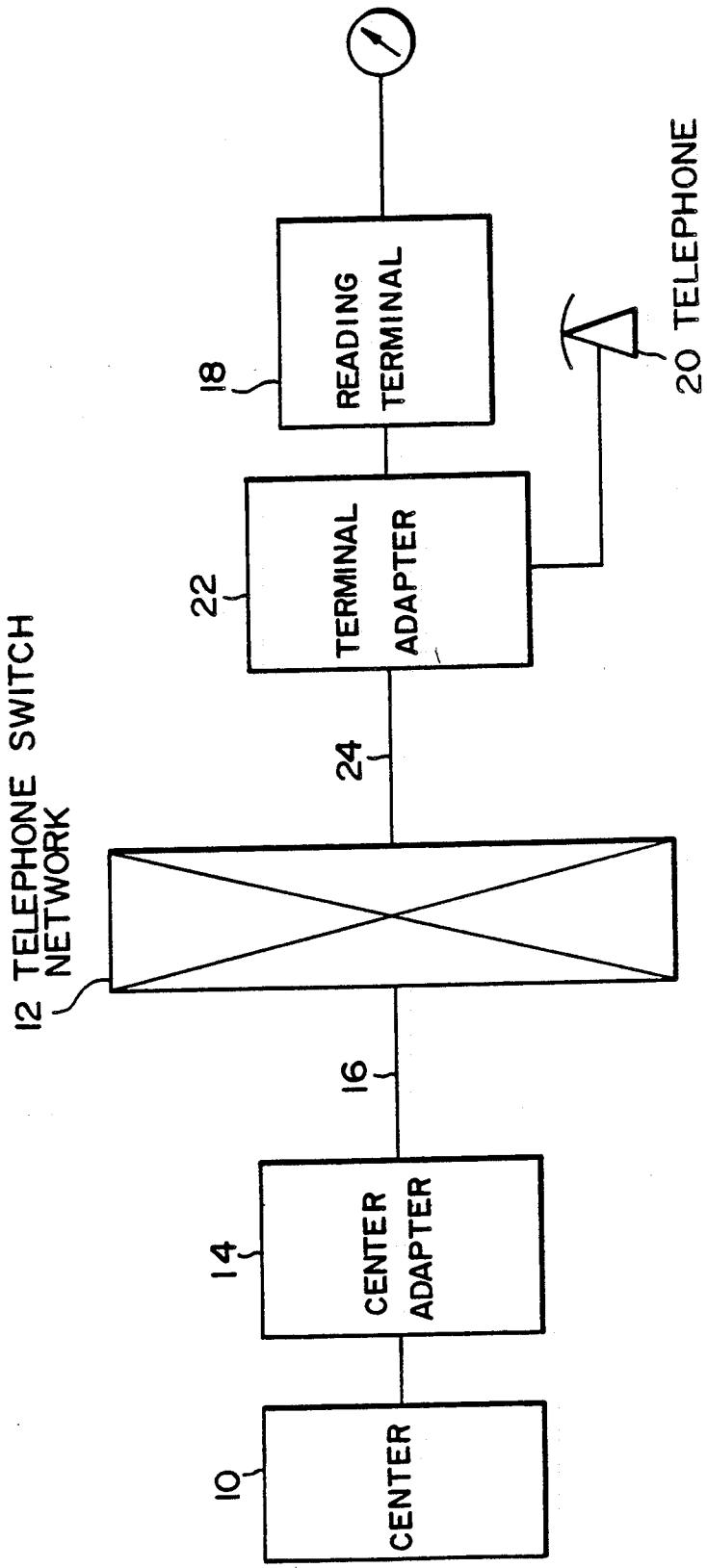
FIG. 1 is a schematic block diagram representative of a telecommunications system embodying the present invention.

Referring to FIG. 1 of the drawings, a telecommunications system embodying the present invention is shown in which central equipment (a data or supervising center) and a terminal to be supervised by the center are communicatable over an ordinary switched telephone network. In the figure, central equipment or supervising center 10 is connected to a telephone switching network 12 via a center adapter 14 and a telephone line 16. A non-telephone terminal 18 and a telephone or subscriber set 20 associated therewith are connected to a terminal adapter 22 which in turn is connected to a telephone line or telephone subscriber line 24. A meter, sensor and so forth are connected to the non-telephone terminal 18. The supervising center 10 supervises the non-telephone terminal or reading terminal 18 and communicates with the terminal 18 by calling it up. To call the reading terminal 18, a center 10 performs a first call origination, the confirmation of the resulting ringing tone or audible ringing signal, and a second call origination which follows the confirmation of the ringing tone, as described in detail later.

Figure 2:
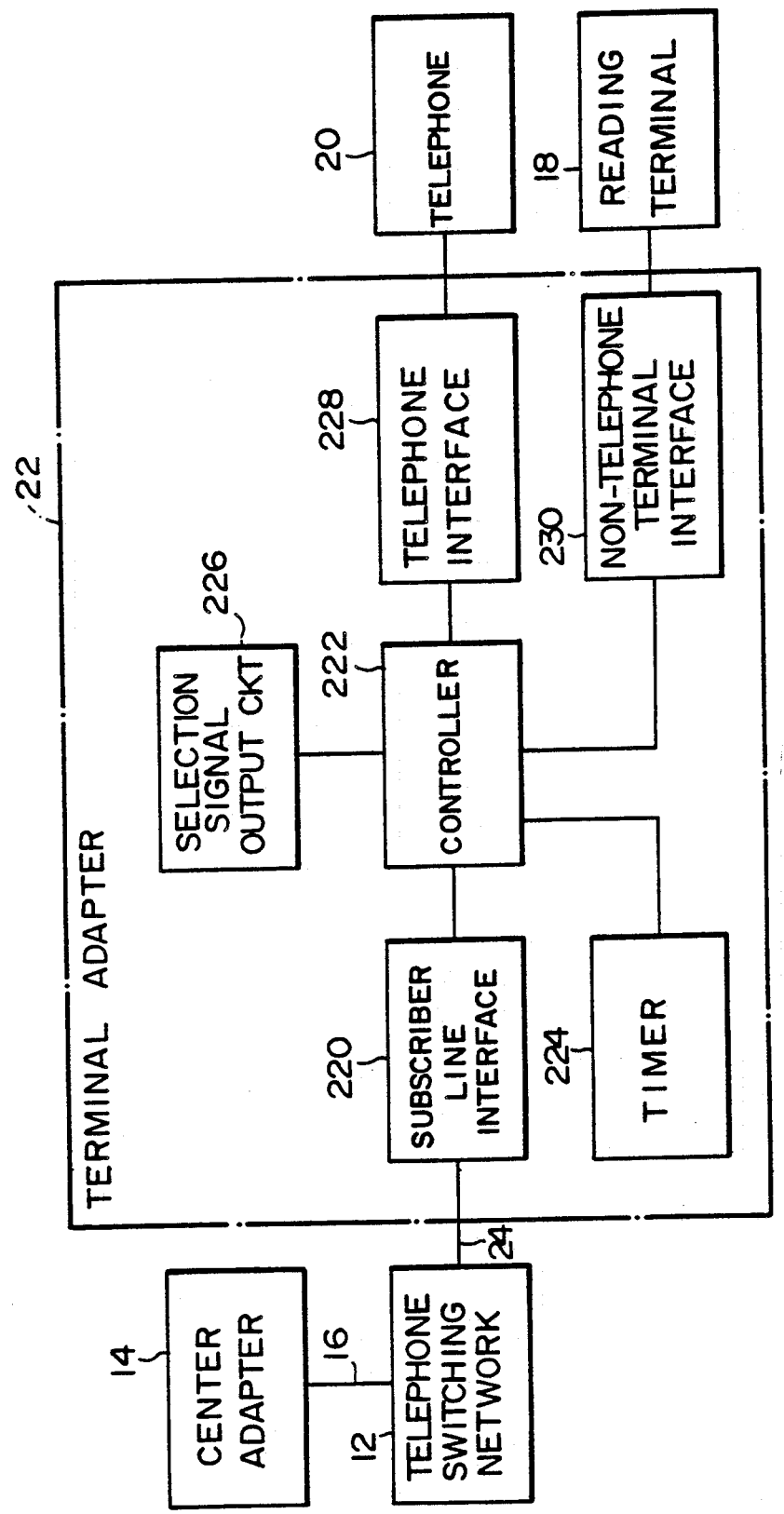
FIG. 2 is a schematic block diagram showing a specific construction of a terminal adapter included in the system of FIG. 1.

FIG. 2 indicates a specific construction of the terminal adapter 22. As shown, the terminal adapter 22 has an office line or subscriber line interface 220 which is connected to the telephone line or subscriber line 24 which is shared by the telephone terminal 20 and reading terminal 18. The subscriber line interface 220 monitors the condition of the subscriber line 24, detects the termination of a call, and performs other various functions. A controller 222 serves various functions such as controlling call origination and call termination, detecting conflicts of calls, and controlling the connection of the line. Concerning the connection control, the controller 222 in response to the first call starts a timer 224 which is connected thereto for the purpose of detecting the end of the call and the arrival of the second call. When the second call from the supervising center 10 is received over the telephone subscriber line 24 within a predetermined period of time as counted by the timer 224, the controller 222 connects the telephone line 24 to the reading terminal 18. On the other hand, when the first call from the center 10 continues, the controller 222 connects the telephone line 24 to the telephone 20. Specifically, the timer 224 is loaded with a period of time for monitoring the interval between the occurrence of the first call and that of the second call.

A selection signal outputting circuit 226 is loaded with desired destination selection signals including a selection signal for accessing the supervising center 10. In response to a line switchover command from the controller 222, the selection signal outputting circuit 226 feeds any of the selection signals associated with the command to the controller 222. A telephone interface 228 connects the telephone subscriber line 24 to the telephone 20 by monitoring the selection signal which is fed from the controller 222 to the line 24, or connects the telephone 20 to the line 24 via the controller 222 by monitoring the origination of a call on the telephone 20. A non-telephone terminal interface 230 connects the subscriber line 24 to the reading terminal 18 by monitoring the selection signal sent over the line 24 from the controller 222, or connects the terminal 18 to the line 24 via the controller 222 by monitoring the origination of a call by the terminal 18. Another function assigned to the non-telephone terminal interface 230 is to control the procedure of data transmission from the reading terminal 18.

The telecommunications system shown in FIGS. 1 and 2 will be operated as follows. In the illustrative embodiment, the telephone switching network 12 is constructed to transmit a ringing and a ringing tone to each of the lines 16 and 24 at a period of 3 seconds in total, i.e. 1.0 second for making and 2.0 seconds for breaking. Concerning the subscriber line interface 220 of the terminal adapter 22, an arrangement is made such that it detects the ringing coming in over the subscriber line 24 and thereby recognizes the termination of a call on receiving the ringing for only 0.3 second.

When the supervising center 10 is to call the reading terminal 18, the center adapter 14 originates a call by automatically dialing the telephone number which is assigned to the terminal 18. As a ringing tone begins to arrive at the center adapter 14 after the origination of the call, the adapter 14 releases the call on the lapse of about 2.5 seconds so as to end calling the reading terminal 18. This call will hereinafter be referred to as a false call for convenience. The terminal adapter 22 receiving a ringing due to the false call performs no operations by simply ignoring the ringing for about 5 seconds. When the ringing continues for more than 5 seconds, the terminal adapter 22 sends the ringing to the telephone 20 to thereby ring the bell of the latter. If the ringing ends before 5 seconds expires, the telephone 20 is not caused to sound at all. When the terminal adapter 22 receives another ringing after the detection of the false call, it determines that the subsequent call is a call from the supervising center 10 and connects the reading terminal 18 to the telephone network 12.

On the other hand, when the reading terminal 18 is to call the supervising center 10 for interchanging data with the latter, the terminal adapter 22 dials the telephone number or subscriber number of the center 10 as in an ordinary data communication procedure.

Figure 4:
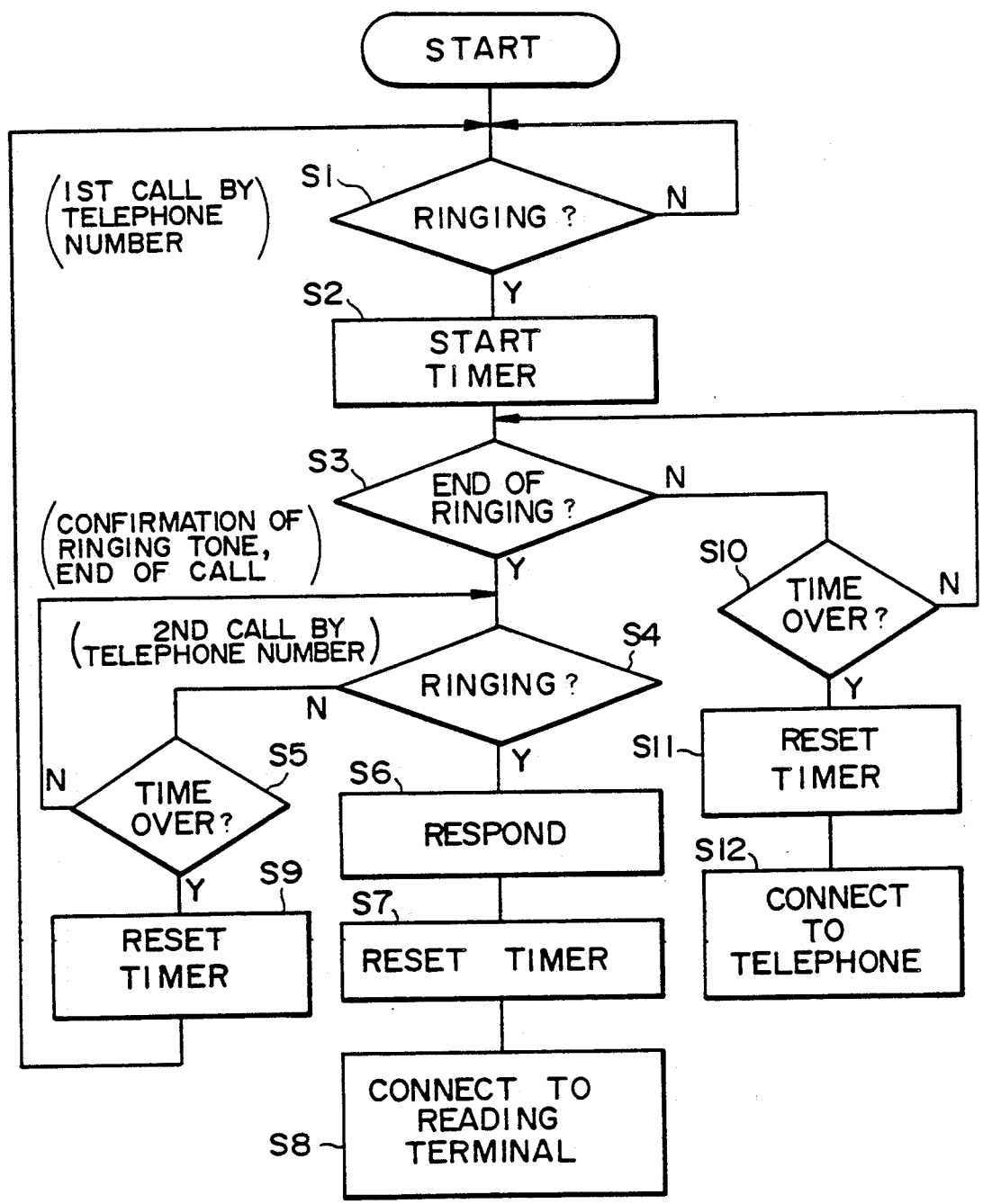
FIG. 4 is a flowchart demonstrating a specific procedure for calling a non-telephone terminal of the illustrative embodiment.

Referring to FIG. 4, the operation of the telecommunications system shown in FIGS. 1 and 2 are demonstrated in a flowchart. It is to be noted that the flowchart concentrates on how the terminal adapter 22 operates in response to a call originated by the supervising center 10 or any other external facility, the operations of the center 10 being indicated by parentheses. As shown, when the supervising center 10 calls the reading terminal 18 by dialing the subscriber number assigned to the associated telephone 20 for the first time, the controller 222 of the terminal adapter 22 receives the resulting ringing (step S1) and then starts the timer 224 (S 2). During the first call or false call, the center 10 monitors a ringing tone which is expected to be returned from the telephone switching network (local switch) 12. On confirming the ringing tone, the center 10 immediately releases the line 16 and then originates the second call by using the same destination number. The controller 222 sees that the ringing due to the false call has ended (S3) and then awaits the arrival of a ringing due to the second call. When the controller 222 confirms the ringing associated with the second call before the time of the timer 224 expires (S4 and S5), it determines that the second call is meant for the reading terminal 18 and responds to the call (S6). At the same time, the controller 222 resets the timer 224 (S7) and connects the subscriber line 24 to the reading terminal 18 (S8). This is followed by a predetermined procedure which allows the center 10 and the reading terminal 18 to interchange data with each other. It is noteworthy that the telephone switching network 12 does not charge the center equipment 10 for the first or false call because the call is released without awaiting an answer.

When the time of the timer 224 expires as decided by the step S5, the controller 222 resets the timer 224 (S9) and again awaits the arrival of a ringing associated with another first call (S1). Further, when the ringing due to the first call continues even after the expiration of the predetermined time as determined by the step S3 (S10), the controller 222 regards that the call being terminated is from a facility other than the supervising center 10 and, so, resets the timer (S11) while connecting the telephone 20 to the subscriber line 24 (S12).

Figure 3:
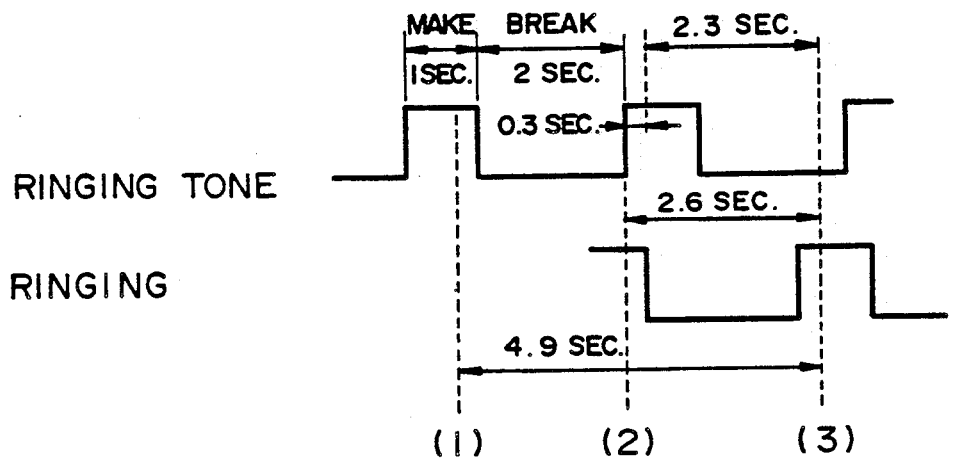
FIG. 3 plots signal waveforms which are useful for understanding the operation of the system shown in FIG. 1.

Why the center adapter 14 releases the false call on the lapse of 2.5 seconds after confirming the ringing tone and why the terminal adapter 22 ignores the ringing for 5 seconds will be described with reference to FIG. 3. It is to be noted that in FIG. 3 the ringing tone returned to the calling station and the ringing sent to the called station are not always surely synchronous with each other. As FIG. 3 indicates, a period of time of 2.6 seconds at maximum suffices for the terminal adapter 22 to recognize that a ringing has been received (interval between (2) and (3) in the figure). It follows that even if the center adapter 10 releases a call on the lapse of 2.3 seconds after recognizing that it is calling, the terminal adapter 22 can see that it is being called. However, even through the center adapter 10 may release the call on the lapse of 0.3 seconds, there is a fear that a ringing arrives at the called station before the center adapter 14 confirms a ringing tone, inasmuch as the ringing tone and the ringing signal are not always synchronous with each other. Then, the ringing would be continuously received for 4.9 seconds at maximum by the called station (interval between (1) and (3) in the figure). In the light of this, the terminal adapter 22 ignores a ringing for about 5 seconds so that the telephone 20 may be inhibited from ringing in response to a false call from the supervising center 10.

Figure 5:
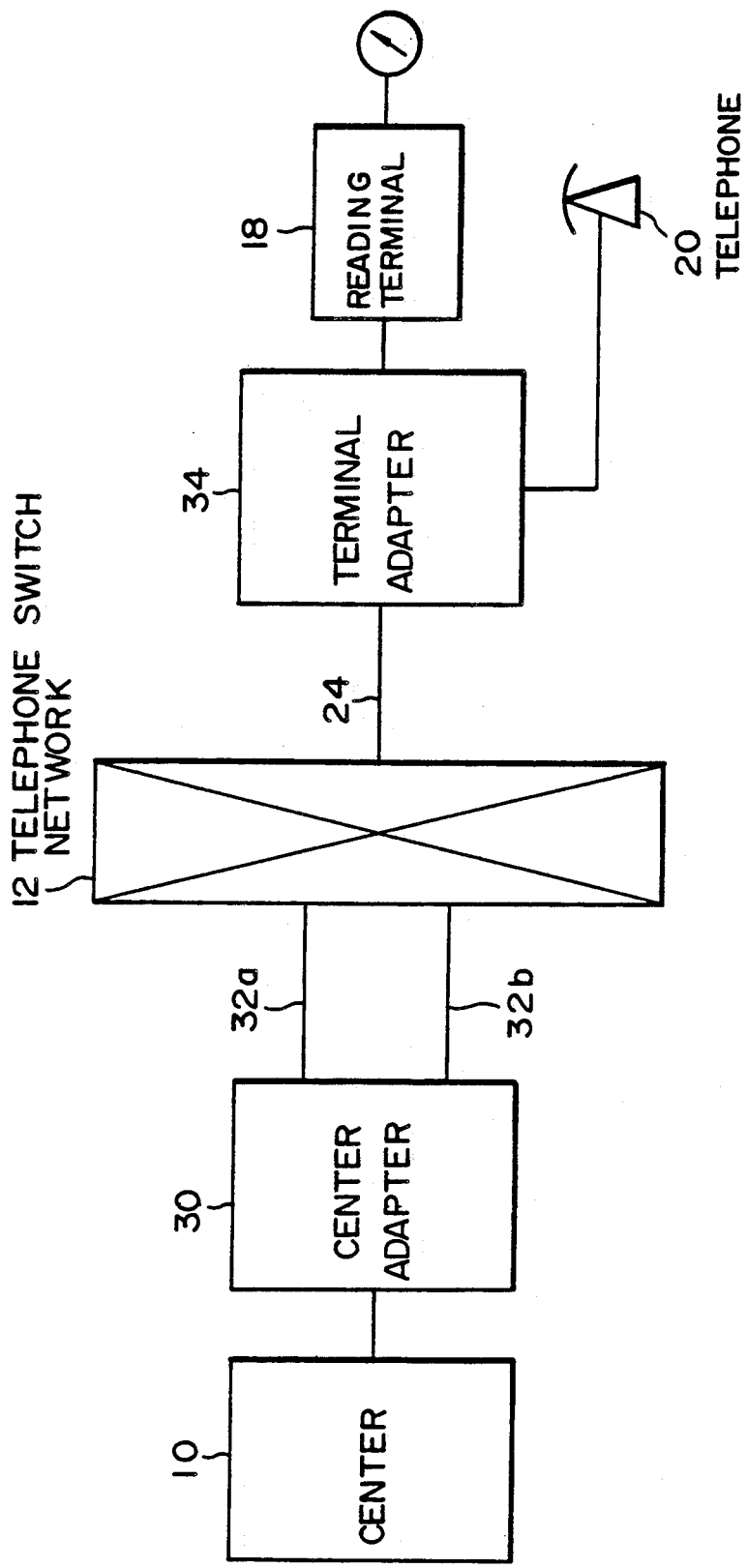
FIG. 5 is a view similar to FIG. 1, representative of an alternative embodiment of the present invention.

Referring to FIG. 5, an alternative embodiment of the present invention is shown which contemplates to reduce the period of time during which the terminal adapter should ignore a ringing to less than about 5 seconds and thereby to free a subscriber originating a call destined to the telephone 20 on another telephone from a long waiting time. In the figure, similar components or structural elements are designated by the same reference numerals, and redundant description will be avoided for simplicity. As shown, the telecommunications system has a center adapter 30 which is connected to the telephone swiching network 12 by a pair of telephone lines 32a and 32b. A terminal adapter 34 is connected to the telephone switching network 12 by the telephone subscriber line 24.

Figure 6:
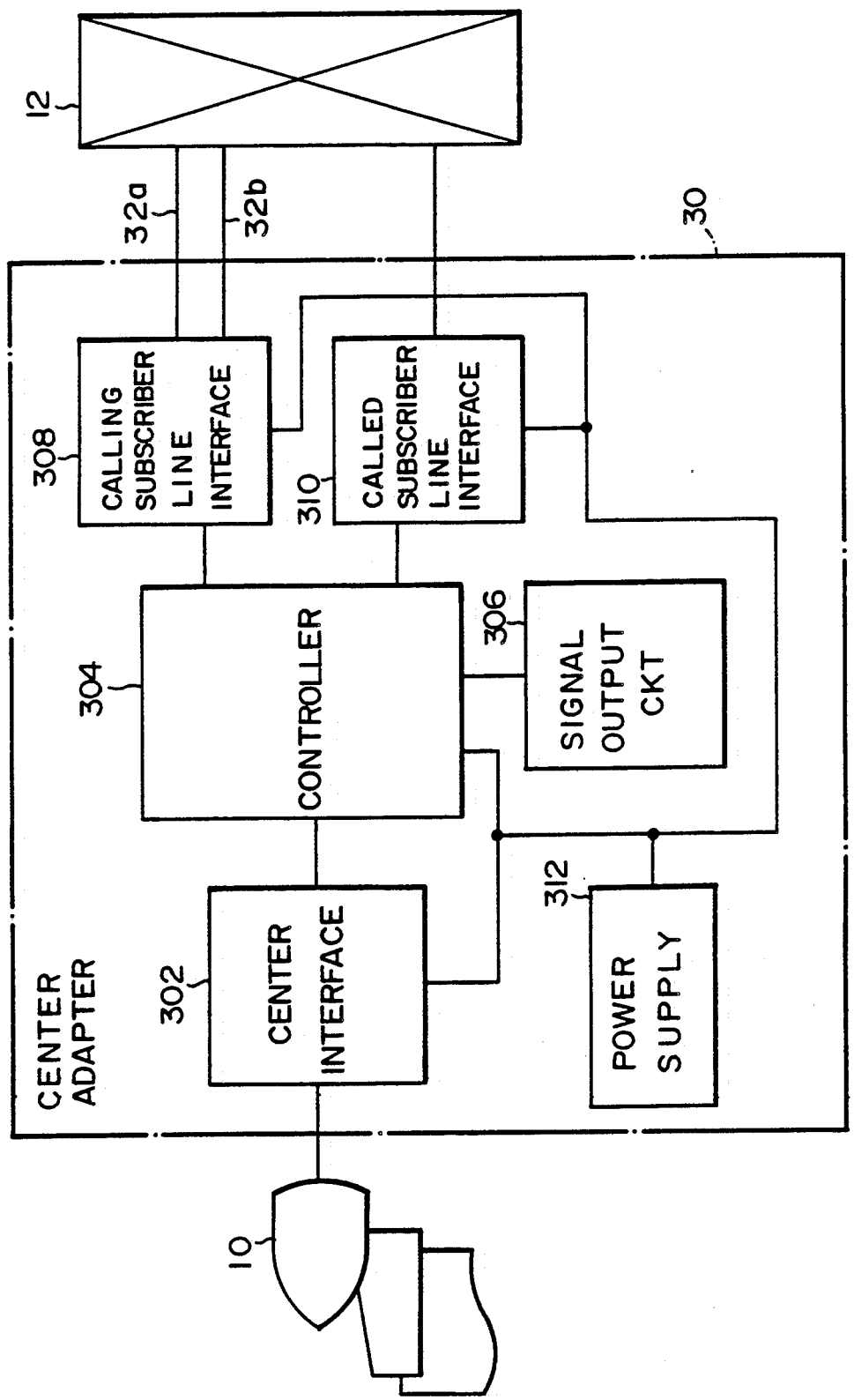
FIG. 6 is a schematic block diagram showing a specific construction of a center adapter included in the embodiment of FIG. 5.

FIG. 6 indicates a specific construction of the center adapter 30 which is a network control unit for controlling the connection of the supervising center 10 and the telephone switching network 12.

As shown, the center adapter 30 has a center interface 302 which interfaces the center adapter 30 to the supervising center 10. A controller 304 controls the origination and termination of a call between the supervising center 10 and the reading terminal 18. A signal outputting circuit 306 delivers a dial signal representative of a subscriber telephone number or destination to the controller 304. A calling subscriber line interface 308 and a called subscriber line interface 310 are also installed in the center adapter 30 and connected as illustrated. A power supply 312 is implemented by a commercially available AC 100 volt power supply and feeds power to the individual blocks of the center adapter 30.

The operation of the center adapter 30 having the above construction is as follows. A call origination request from the supervising center 10 is fed to the controller 304 of the center adapter 30 via the center interface 302. In response, the controller 304 reads the subscriber telephone number assigned to the destination 18 out of the signal outputting circuit 306. By automatically dialing the telephone number of the destination 18, the controller 304 sends a call over each of the two telephone lines 32a and 32b at the same time, thereby starting on first call or false call processing. If the telephone 20 associated with the reading terminal 18 is not busy, either one of the calls sent over the lines 32a and 32b will be terminated at the line 24 of the terminal adapter 34. In this condition, a busy tone is returned from the telephone switching network 12 to the center adapter 30 over one of the lines 32a and 32b while a ringing tone is returned to the same over the other line. In this particular embodiment, the busy tone returned from the telephone switching network 12 is implemented as a tone having a predetermined frequency and occurring at a period of 1 second, a making time and a breaking time of the tone being 0.5 second each. While the busy tone and the ringing tone are detected by the calling subscriber line interface 308, the period of time needed to recognize them is not longer than 0.3 second at maximum in the illustrative embodiment.

On recognizing the busy tone, the controller 304 releases the call on one of the lines 32a and 32b over which the busy tone is returned, e.g. line 32a. After a predetermined period of time has expired, the controller 304 releases the call on the other line 32b over which the ringing tone is returned. This is the end of the false call processing. Before a predetermined period of time, e.g. 40 seconds expires after the false call processing, the controller 304 sends a call meant for the same terminal 18 over one of the lines 32a and 32b by dialing the same subscriber telephone number. As soon as the center adapter 30 succeeds in connecting the supervising center 10 to the reading terminal 18, the center 10 transmits a center identification (ID) signal CS to the terminal 18 within a predetermined period of time such as 2 seconds. On receiving an answer from the terminal 18, the center 10 enters into a communication with the terminal 18 for interchanging data with the latter.

When a busy tone is returned over both of the lines 32a and 32b from the telephone switching network 12 at the time of false call, the controller 304 of the supervising center 30 repeats the false call processing on the lapse of a predetermined period of time.

When the reading terminal 18 has originated a call destined to the center equipment 10, the controller 304 is informed of the termination of the call via the called subscriber line interface 310 so that data is transferred from the supervising center 10 to the terminal 18. While the calling and called subscriber line interfaces 308 and 310, respectively, are shown in independent blocks in FIG. 6, they may of course be implemented as a single unit with respect to the system construction.

Referring to FIG. 7, a specific construction of the terminal adapter 34 which serves as a network control unit for controlling the connection of the telephone 20 and reading terminal 18 and the telephone switching network 12 is shown. As shown, the terminal adapter 34 has a switch 342 which is operated in the event of power failure, for example, for directly connecting the telephone 20 to the telephone switching network 12. A subscriber line interface 344 detects the termination of a call. A controller 346 controls the switchover of the connection of the reading terminal 18 and telephone 20 and the telephone switching network 12 as well as the origination and termination of a call. A telephone interface 348 interfaces the telephone 20 to the controller 346 and therefore to the telephone switching network 12 so as to detect origination of a call and to feed power to the telephone 20. A terminal interface 350 interfaces the reading terminal 18 to the controller 346 and therefore to the telephone switching network 12 and functions to detect a call from the terminal 18, control the protocol, and feed power to the terminal 18. A signal outputting circuit 352 delivers to the controller 346 a dial signal representative of a telephone number assigned to the supervising center 10, for example. A power supply 354 powers the individual blocks of the terminal adapter 34 and may be implemented by a commercially available AC 200 volt power supply.

Whether the controller 346 should terminate an incoming call from the telephone switching network 12 to the telephone 20 or to the reading terminal 18 is determined by the duration of a ringing associated with the first call, i.e. false call. Specifically, on recognizing a ringing, the controller 346 ignores it for 3.4 seconds as counted from the instant of reception of the ringing and, when the ringing has continued for 3.4 seconds, brings the telephone 20 into connection with the telephone switching network 12. When the ringing disappears within 3.4 seconds, the controller 346 sets up a center call wait mode by determining that the supervising center 10 has originated a false call. The controller 346 recognizes a subsequent call received within 40 seconds after the disappearance of the ringing to be a call from the center 10. If no call is received within 40 seconds, the controller 346 restores the ordinary mode. For a predetermined period of time during which a call from the center 10 is not expected to occur after the false call, the controller 346 maintains an off-hook state or busy state to prevent the sequence for awaiting the second call from the center 10 from being interrupted by a call which might be received from a facility other than the center 10. When a call is received within 40 seconds except for such a particular period of time, the controller 346 sets up an off-hook state. Then, on receiving the previously mentioned center ID signal CS within, in the illustrative embodiment, 2 seconds, the controller 346 causes the reading terminal 18 into connection with the telephone switching network 12.

Figure 8:
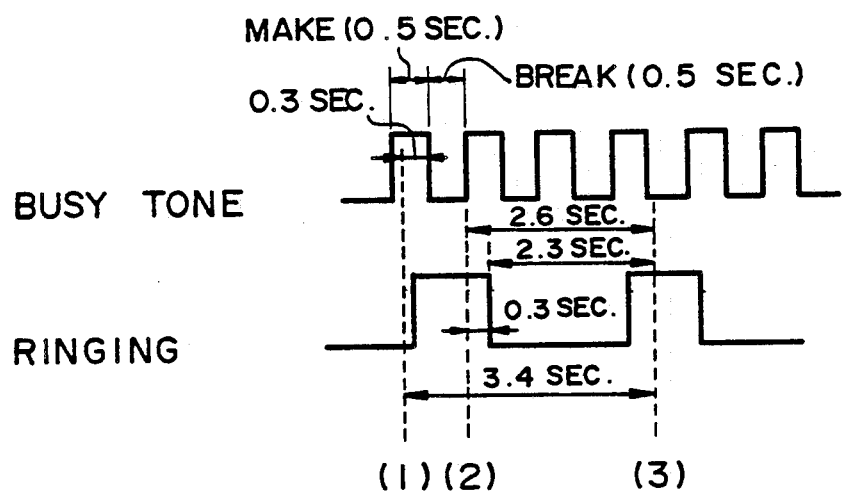
FIG. 8 plots waveforms useful for understanding the operation of the embodiment shown in FIG. 5.

A reference will be made to FIG. 8 for describing why the center adapter 30 releases the false call on the lapse of 2.3 seconds after the confirmation of the busy tone and why the terminal adapter 34 ignores the ringing for 3.4 seconds, as stated earlier. In the figure, when the center adapter 30 releases the false call on the lapse of 2.3 seconds after the confirmation of the busy tone, the terminal adapter 34 is called for 2.6 seconds and, during this period of time, the ringing can be recognized at least once (interval between (2) to (3) in the figure) to see that the fall call is being received. Even though the busy tone returned to the central station and the ringing sent to the terminal station are not always synchronous in phase, the terminal adapter 34 is capable of determining that the incoming call is a call from the supervising center 10 if the call is released within 3.4 seconds at maximum (interval between (1) and (3) in the figure). Then, the terminal adapter 34 ignores the ringing for 3.4 seconds and, if the ringing continues over 3.4 seconds, sends a ringing to the telephone 20. As a result, the telephone 20 rings to inform a person of the fact that the incoming call is originated on an ordinary subscriber telephone.

While the delivery of a busy tone to the central station and the delivery of a ringing to the terminal station have been shown and described as beginning at the same time, the delivery of a busy tone is sometimes delayed depending on the number of switches, for example, which intervene between the central and terminal stations. For this reason, the interval of 2.3 seconds between the beginning of the busy tone and the release of the call which received the ringing has to be reduced to compensate for the delay. Nevertheless, it is not necessary to change the period of time during which the terminal adapter 34 should ignore the ringing.

Figure 9:
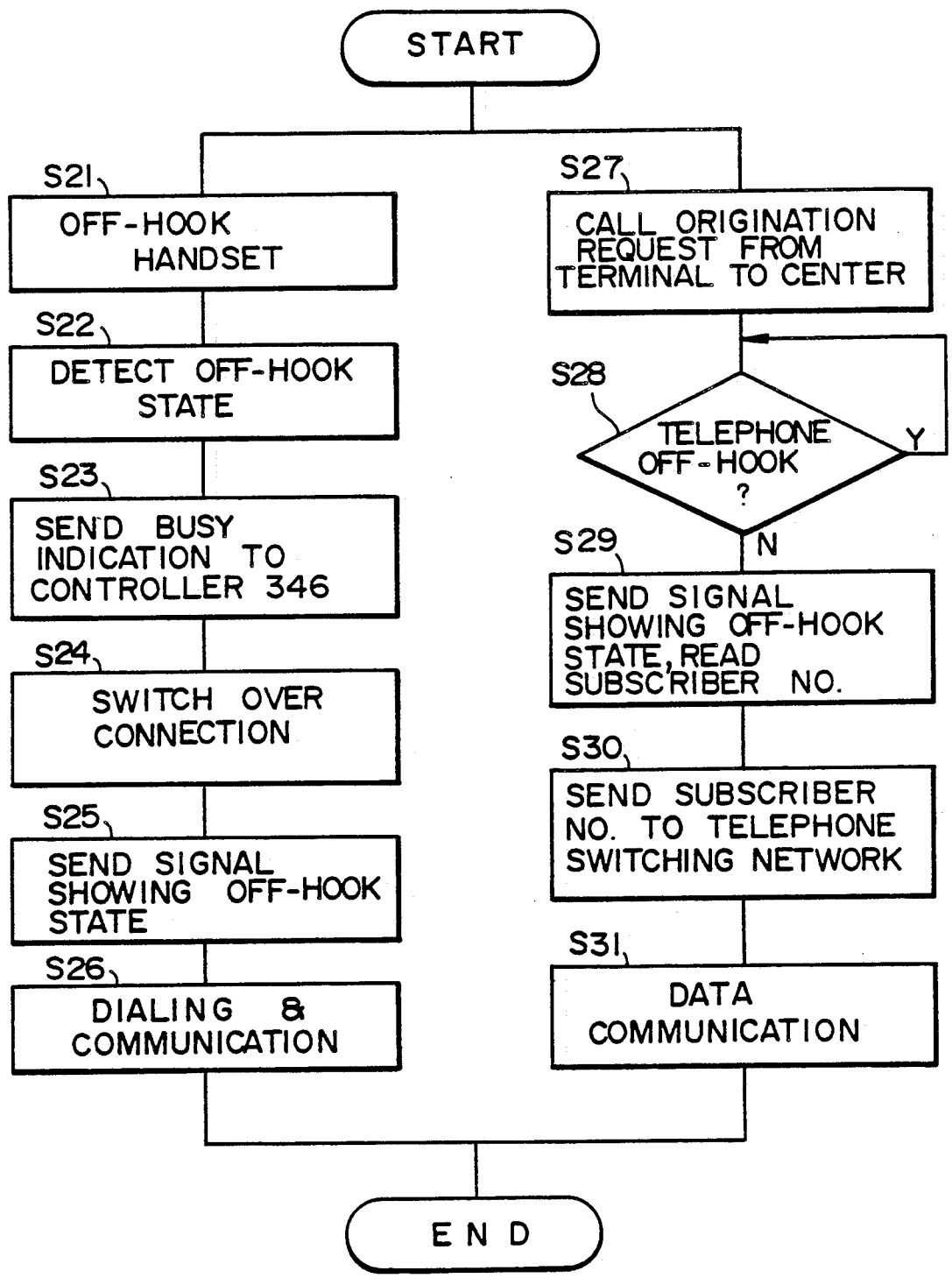
FIG. 9 is a flowchart indicating a specific procedure in which a non-telephone terminal of the embodiment shown in FIG. 5 originates a call.
Figure 10A:
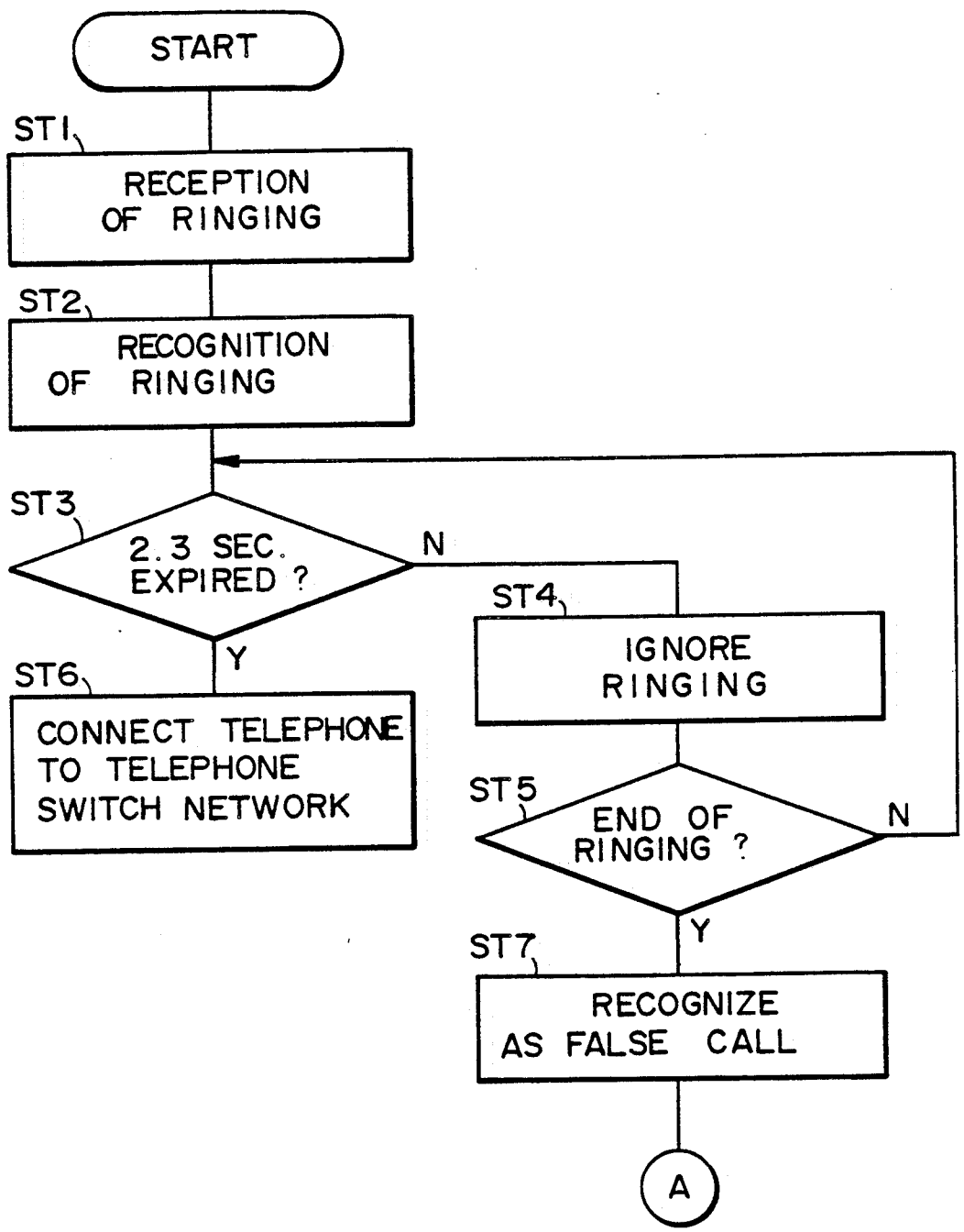
FIG. 10A and 10B depict a specific procedure in which a supervising center of the embodiment shown in FIG. 5 calls the non-telephone terminal.
Figure 10B:
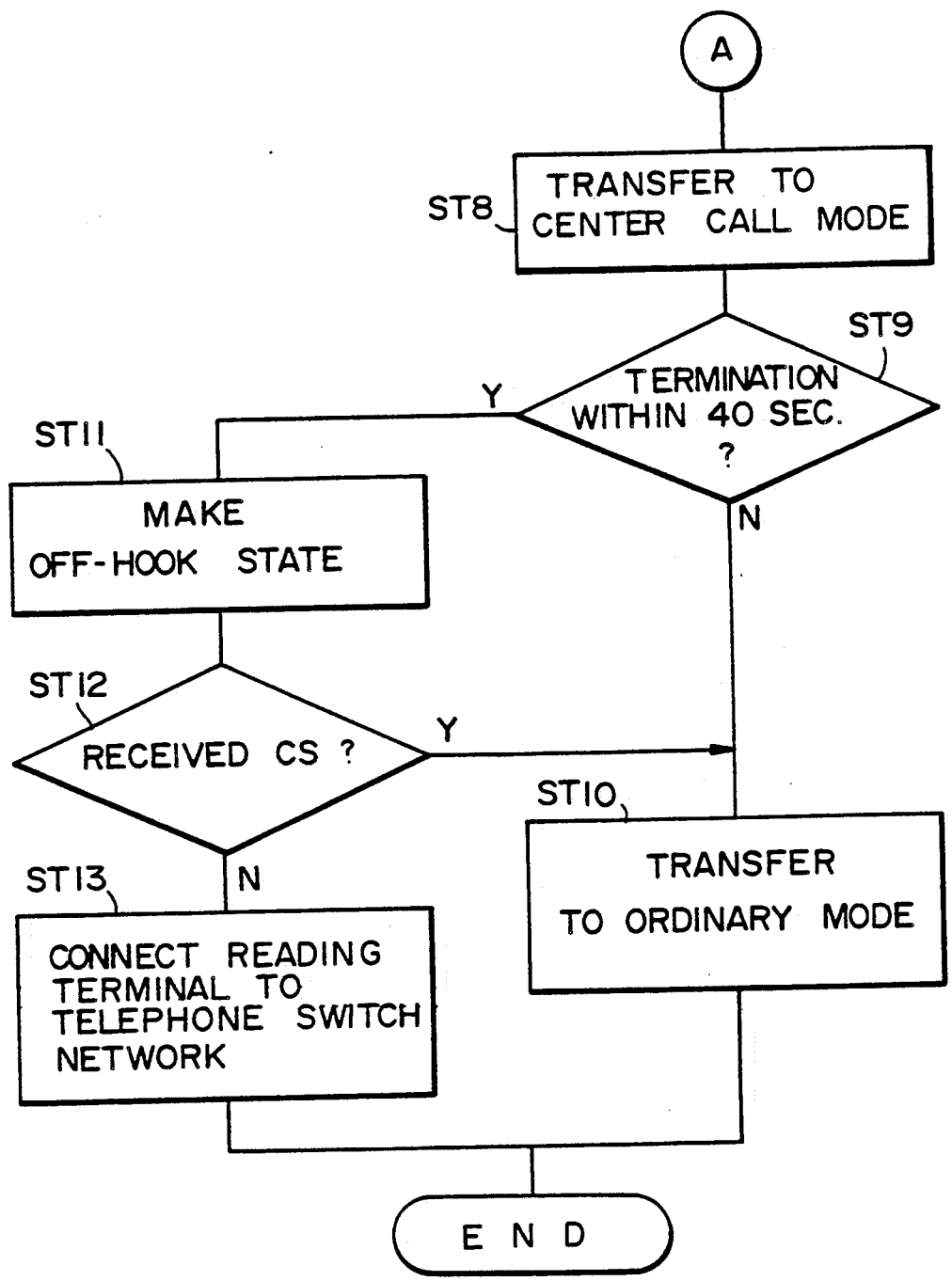

FIGS. 9, 10A and 10B demonstrate specific operations of the terminal station of the telecommunications system shown in FIG. 5. First, a reference will be made to FIG. 9 for describing the origination of a call on the terminal station. When the subscriber telephone 20 is used to originate a call with the handset being held in an off-hook state, the telephone interface 348 senses the off-hook state (S22) to command the controller 346 a busy indication (S23). In response, the controller 346 connects the telephone 20 to the telephone switching network 12 (S24) and sends a signal representative of the off-hook state to the telephone switching network 12 via the subscriber line interface 344 and switch 342 (S25). This is followed by an ordinary communication on the telephone 20 (S26).

A call origination request from the reading terminal 18 to the supervising center 10 is applied to the controller 346 of the terminal adapter 34 via the non-telephone terminal interface 350 (S27). In response, the controller 346 determines whether or not the telephone 20 is in use (S28) and then delivers a signal representative of the off-hook state to the telephone switching network 12. The controller 346 reads a dial signal representative of the telephone number of the supervising center 10 out of the signal outputting circuit 46 (S29). This dial signal is fed out to the subscriber line 24 via the subscriber line interface 344 and switch 342 (S30), whereafter a data communication is held between the supervising center 10 and the reading terminal 18.

The origination of a call at the supervising center 10 will be described with reference to FIGS. 10A and 10B. A call from the supervising center 10 is received by the terminal adapter 34 in the form of a ringing via the center adapter 30, lines 32a and 32b and telephone switching network 12 (step ST1). The ringing is applied to the controller 346 via the switch 342 and subscriber line interface 344, so that the controller 346 recognizes that the input signal is a ringing (ST2). On recognizing the ringing, the controller 346 determines if 2.3 seconds has expired as counted from that moment (ST3). If 2.3 seconds has not expired, the controller 346 ignores the ringing (ST4) and further determines whether or not the ringing has ended within 3.4 seconds after the recognition of the ringing (ST5). If the ringing has not ended as determined by the step ST5, the program returns to the step ST3. If the ringing has ended within such the above-mentioned period of time, the controller 346 connects the telephone 20 to the telephone switching network 12 to thereby cause the latter to ring (ST6).

If the ringing has ended within 3.4 seconds as decided in the step ST5, the controller 346 determines that the ringing is representative of a false call from the supervising center 10 (ST7) and then assumes a center call waiting mode (ST8, FIG. 10B). The controller 346 then determines if a call is received within 40 seconds after the end of the ringing (ST9) and, when the result of decision is negative, restores the ordinary mode (ST10). If the controller 346 determines that a call has been received in the step ST9, it turns the state of the subscriber line 24 from on-hook to off-hook (ST11). Then, the controller 346 sees if a center ID signal CS has been received within 2 seconds (ST12) and, when two seconds expires without the signal CS being received, immediately disconnects terminal adapter 34 from the line 24 and returns to the ordinary mode. If the decision in the step S12 is positive, the controller 346 connects the line 24 and the reading terminal 18 via the non-telephone terminal interface 350 (ST13). Thereafter, data are interchanged between the center 10 and the reading terminal 18.

In this particular embodiment, a call originated at the supervising center 10 is sent to the reading terminal 18 over a pair of lines 32a and 32b at the same time. This reduces the period of time during which a ringing should be ignored and thereby implements a system which has a minimum of influence on the waiting time which is associated with an incoming call originated on a facility other than the supervising center 10.

While the terminal adapter 34 is constructed to ignore a ringing for 3.4 seconds, such a period of time is only illustrative and may be suitably selected on a system basis in matching relation to particular characteristics of the telephone switching network 12 used and may even be changed as desired. Further, the commercially available AC 100 volt power supply used to power the center and terminal adapters 30 and 34 may be replaced with a cell or, in the case of outdoor installation, with a solar cell. The terminal adapter 34 and the non-telephone terminal 18 are shown as being implemented by independent units, but they of course may be combined in a single unit.

In summary, a telecommunications system of the present invention allows a supervising center to call a non-telephone terminal by causing the center to send two consecutive calls to the terminal and, when a terminal adapter confirms the two concecutive calls, connecting a subscriber line to the terminal by determining that the terminal is being called. Hence, the supervising center and the non-telephone terminal can be connected to hold a communication without resorting to any modification of an existing system or any extra function. Since the connection is switched over by monitoring the time, the construction is sufficiently simple to implement a center call origination type telecommunications system.

In another aspect of the present invention, a supervising center and a telephone switching network are interconnected by a pair of lines. The center sends the first call over the two lines at the same time and by dialing the same subscriber number and, on confirming a busy tone returned over either one of the two lines in response to the first call, ends the first call when a predetermined period of time expires. Then, the center sends the second call by using the same subscriber number. When a terminal adapter confirms the first and second calls in sequence, it connects the telephone switching network and a non-telephone terminal which is connected to the terminal adapter. Such a configuration is successful in reducing the period of time during which the terminal adapter should ignore a ringing for switching over the telephone and the non-telephone terminal, whereby a system promoting efficient use of a telephone facility (resource) for communications is realized.

Furthermore, since the system of the present invention allows data to be interchanged with efficiency over a telephone switching network, it is applicable not only to various kinds of automatic telemetering but also to a home security system in which a center and terminals interchange data and an on-line system in which terminals are accommodated in telephone lines. The system may even implement the communication between a communication center and personal computers, a facsimile center and facsimile terminals, and so forth over a telephone switching network.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A telecommunications system comprising:
   a telephone switching network for switching a plurality of telephone lines;
   a telephone terminal accessible to said telephone switching network;
   a non-telephone terminal for performing data communication via said telephone switching network;
   first network control means connected to a first telephone line of said plurality of telephone lines for controlling connection of said telephone terminal and said non-telephone terminal and said telephone switching network;
   center equipment for supervising data communication to said non-telephone terminal on a call terminated via said telephone switching network to the first telephone line; and
   second network control means connected to a second telephone line of said plurality of telephone lines for controlling connection of said center equipment and said telephone switching network;
   said second network control means having means for originating a first call to said telephone switching network in response to said center equipment by using a subscriber number which is assigned to said telephone terminal so that said telephone switching network terminates the first call at said first telephone line in response to the subscriber number and informs said second network control means via said second telephone line of the termination of the first call at said first telephone line;
   said second network control means having means for releasing the first call on detecting the termination at said first telephone line and, thereafter, originating a second call to said telephone switching network by using the subscriber number;
   said telephone switching network terminating the second call in response to the subscriber number;
   said first network control means having means for detecting the termination of the first call over the first telephone line and subsequent release of the first call and then detecting the termination of the second call, and for answering the second call by connecting said non-telephone terminal to said first telephone line in response to the termination of the second call with said telephone switching network setting up a connection between said first and second telephone lines in response to the answer to the second call by said first network control means and with said first network control means connecting said non-telephone terminal to said first telephone line to allow the data communication between said non-telephone terminal and said center equipment.

2. A system in accordance with claim 1, wherein said non-telephone terminal comprises a device for reading a gas meter, said device transmitting data representative of an amount of gas used.

3. A system in accordance with claim 1, wherein
   said telephone switching network sends a ringing to said first telephone line and a ringing tone to said second telephone line, in the event of termination of a call at said first telephone line;
   said second network control means releasing the call on detecting the ringing tone.

4. A system in accordance with claim 3, wherein said first network control means connects said telephone terminal to said first telephone line when the ringing continues for a predetermined period of time.

5. A system in accordance with claim 4, wherein the ringing tone has a period of 3 seconds made up of 1 second for making and 2 seconds for breaking, the predetermined period of time being at least 2.3 seconds.

6. A system as in claim 1, wherein first network control means includes means for connecting said non-telephone terminal to said first telephone line in response to the termination of the second call during the second call, said telephone switching network setting up the connection between the first and second telephone lines during the second call.

7. A system in accordance with claim 1, wherein
   said second network control means is additionally connected to said telephone switching network by a third telephone line of said plurality of telephone lines;
   said second network control means, when originating the first call over said second telephone line by using the subscriber number of said telephone terminal in response to said center equipment, originating a third call to said telephone switching network over said third telephone line by using said subscriber number substantially simultaneously with said first call over said second telephone line; said telephone switching network transmitting a ringing to said first telephone line in response to the subscriber number and concurrently therewith sending a ringing tone to one of said second and third telephone lines and a busy tone to the other of said second and third telephone lines;

said second network control means, on detecting the busy tone, releasing the first and third calls on said second and third telephone lines.

8. A system in accordance with claim 7, wherein said first network control means connects said telephone terminal to said first telephone line when the ringing continues for a predetermined period of time.

9. A system in accordance with claim 8, the ringing tone has a period of 3 seconds made up of 1 second for making and 2 seconds for breaking, while the busy tone has a period of 1 second made up of 0.5 second for making and 0.5 second for breaking, the predetermined period of time being at least 2.3 seconds.

10. A telecommunications system comprising:
line terminating means for connecting a telephone line which is accommodated in a telephone switching network;
first interface means for connecting a telephone terminal;
second interface means for connecting a non-telephone terminal which performs data communication on a call established via the telephone switching network; and
control means for controlling said line terminating means and said first and second interface means in response to a signal which comes in over the telephone line;
said control means, on detecting termination of a first call over the telephone line via said line terminating means and subsequent release of the first call, monitoring whether or not a second call is received over said telephone line;
said control means, on detecting termination of the second call before a first predetermined period of time expires since the first call, responding to the termination of the second call and connecting said second interface means to said line terminating means.

11. A system in accordance with claim 10, wherein said non-telephone terminal comprises a device for reading a gas meter, said device transmitting data representative of an amount of gas used.

12. A system in accordance with claim 10, wherein said control means on detecting a ringing of the first call over the telephone line via said line terminating means and a following release of the first call, monitors whether or not a ringing of the second call arrives over said telephone line;

13. A system in accordance with claim 12, wherein said control means connects said first interface means to said line terminating means when a ringing of the first call continues for a second predetermined period of time.

14. A system in accordance with claim 13, wherein the ringing has a period of 3 seconds made up of 1 second for making and 2 seconds for breaking, the second predetermined period of time being at least 2.3 seconds.

15. A system in accordance with claim 12, wherein
said control means comprises timer means which is started by said control means for counting the first predetermined period of time;
said control means starting said timer means on detecting arrival of a ringing of the first call over the telephone line via said line terminating means;
said control means, on detecting arrival of a ringing of the first call over the telephone line and subsequent release of the first call before said timer means indicates the expiration of the first predetermined period of time, monitoring whether or not a ringing of the second call arrives over said telephone line until said timer means indicates the expiration of the first predetermined period of time.

16. A system in accordance with claim 12, wherein said control means, on detecting arrival of a ringing of the second call subsequent to the release of the first call, indicates a busy state on the telephone line for a third predetermined period of time which is shorter than the first predetermined period of time.

17. A system in accordance with claim 12, wherein said control means connects said second interface means to said line terminating means on detecting termination of the second call before the first predetermined period of time expires and then detecting arrival of a predetermined signal over the telephone line before a fourth predetermined period of time which follows the first predetermined period of time expires.

18. A telecommunications control apparatus comprising:
line terminating means for connecting a first and a second telephone line accommodated in a telephone switching network;
interface means for connecting center equipment which supervises data communication to a non-telephone terminal which is connected to said center equipment via the telephone switching network; and
control means for controlling said line terminating means and said interface means in response to the center equipment;
said control means sending calls, in response to the center equipment, to the telephone switching network over a first and a second telephone line substantially at the same time by using a subscriber number which is associated with the non-telephone terminal;
said control means, on detecting a busy tone on either one of said first and second telephone lines, releasing the calls on said first and second telephone lines and then calling the telephone switching network again by using the subscriber number;
whereby said non-telephone terminal and said center equipment are allowed to hold a data communication therebetween.

19. An apparatus in accordance with claim 18, wherein said non-telephone terminal comprises a device for reading a gas meter, said device transmitting data representative of an amount of gas used, said center equipment holding data communication with said gas meter reading device.

* * * * *